US009621178B2

(12) United States Patent
Graceffo et al.

(10) Patent No.: US 9,621,178 B2
(45) Date of Patent: Apr. 11, 2017

(54) CLOCK AUTHENTICATION CIRCUITRY FOR CLOCK SIGNALS

(71) Applicant: Raytheon Company, Waltham, MA (US)

(72) Inventors: Gary M. Graceffo, Burke, VA (US); Andrew Kowalevicz, Arlington, VA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/210,230

(22) Filed: Jul. 14, 2016

(65) Prior Publication Data

US 2017/0070234 A1    Mar. 9, 2017

Related U.S. Application Data

(60) Provisional application No. 62/215,404, filed on Sep. 8, 2015.

(51) Int. Cl.
*H03M 1/12* (2006.01)
*G06F 21/44* (2013.01)

(52) U.S. Cl.
CPC ............ *H03M 1/12* (2013.01); *G06F 21/44* (2013.01)

(58) Field of Classification Search
None
See application file for complete search history.

(56) References Cited

U.S. PATENT DOCUMENTS

| 5,502,689 | A | * | 3/1996 | Peterson | G06F 1/3203 368/10 |
| 7,733,424 | B2 | * | 6/2010 | Hayden | H03M 1/08 348/536 |
| 7,825,990 | B2 | * | 11/2010 | Ouyang | H03M 1/127 348/536 |

* cited by examiner

*Primary Examiner* — Howard Williams
(74) *Attorney, Agent, or Firm* — Schwegman Lundberg & Woessner, P.A.

(57) ABSTRACT

Embodiments of clock authentication circuitry (CAC) are generally described herein. The CAC may comprise a compression component, such as a logic gate, to compress a candidate clock signal that is to be authenticated against a reference clock signal. The CAC may further comprise a digital-to-analog converter (DAC) that may be connected to an analog-to-digital converter (ADC) of the CAC. An ADC output sequence may be generated when a predetermined input sequence is input to the DAC while the DAC and the ADC are driven by the compressed candidate clock signal. The candidate clock signal may be authenticated based on an error measurement between the ADC output sequence and a reference ADC output sequence.

26 Claims, 8 Drawing Sheets

CLOCK AUTHENTICATION CIRCUITRY FOR CLOCK SIGNALS

PRIORITY CLAIM

This application claims priority under 35 USC 119(e) to U.S. Provisional Patent Application Ser. No. 62/215,404, filed September 8. 2015 [reference number 15-7138-US-PSP (1547.542PRV)] which is incorporated herein by reference in its entirety.

TECHNICAL FIELD

Some embodiments pertain to reference oscillators. Some embodiments pertain to reference clocks. Some embodiments relate to authentication of reference oscillators and/or reference clocks. Some embodiments relate to secure applications. Some embodiments relate to secure devices and/or secure operation of devices.

BACKGROUND

In some systems, devices and components may be vulnerable to malicious operations such as hacking, eavesdropping and/or other activities. Such malicious operations may compromise a security of the device, which would likely be undesirable to the owner or operator of the device. In addition to comprising the security of those devices, an overall system security may also be compromised in some cases. As security considerations of the device and system in these and other scenarios may be important, there is a general need for methods and systems to provide or increase immunity to these and other malicious operations.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
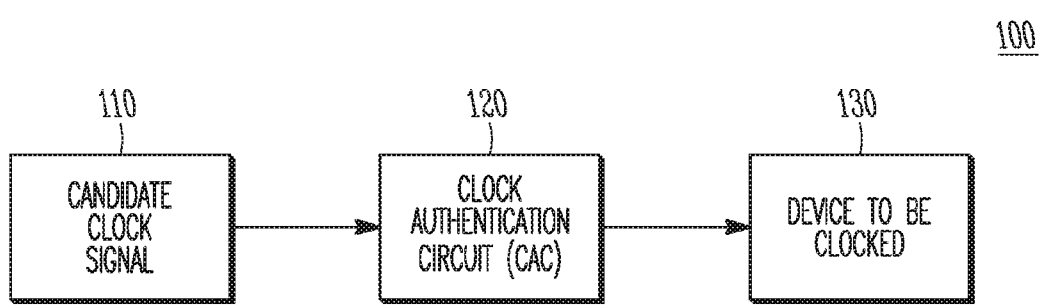
FIG. 1 illustrates an example scenario in accordance with some embodiments.

FIG. 1 illustrates an example scenario in accordance with some embodiments. A candidate clock signal 110 may be used to drive a device, component or module such as the device 130 shown in FIG. 1. In some embodiments, the candidate clock signal 110 may be a square wave, although embodiments are not limited as such. Accordingly, a sinusoidal signal, oscillator signal, control signal, other clock signal and/or other types of signals may be used in some embodiments. As a non-limiting example, the candidate clock signal 110 may be an output of a reference oscillator, a clock generator, a clock circuit, a waveform generator, a piece of test equipment and/or other component.

In some embodiments, a clock authentication circuit (CAC) (such as 120 in the example scenario 100) may be included. Embodiments of the CAC 120 will be described in more detail below. The CAC 120 may be included for security purposes, such as to prevent an unauthorized user from causing the device 130 to operate. In an example scenario, a thief, intruder or adversary may attempt to input a clock signal (such as 110) to the device 130 for malicious purposes such as hacking, eavesdropping and/or other activities that would likely be undesirable to the owner or operator of the device 130. For instance, an attempt may be made to initiate operation of a stolen device 130 by inputting a clock signal 110 in an effort to mimic a clock signal (such as a reference clock signal) expected by the device 130 as part of normal operation.

It should be noted that embodiments are not limited to the example scenario 100 shown in FIG. 1, in terms of number, type and/or arrangement of components. Some embodiments may not necessarily include all components shown in the example scenario 100. Some embodiments may include additional components not shown in the example scenario 100. As an example, one or more additional components, such as a switch or gating component, may be included between the CAC 120 and the device 130, in some cases. As another example, one or more additional components, such as a filter or amplifier, may be included between the CAC 120 and the device 130, in some cases.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
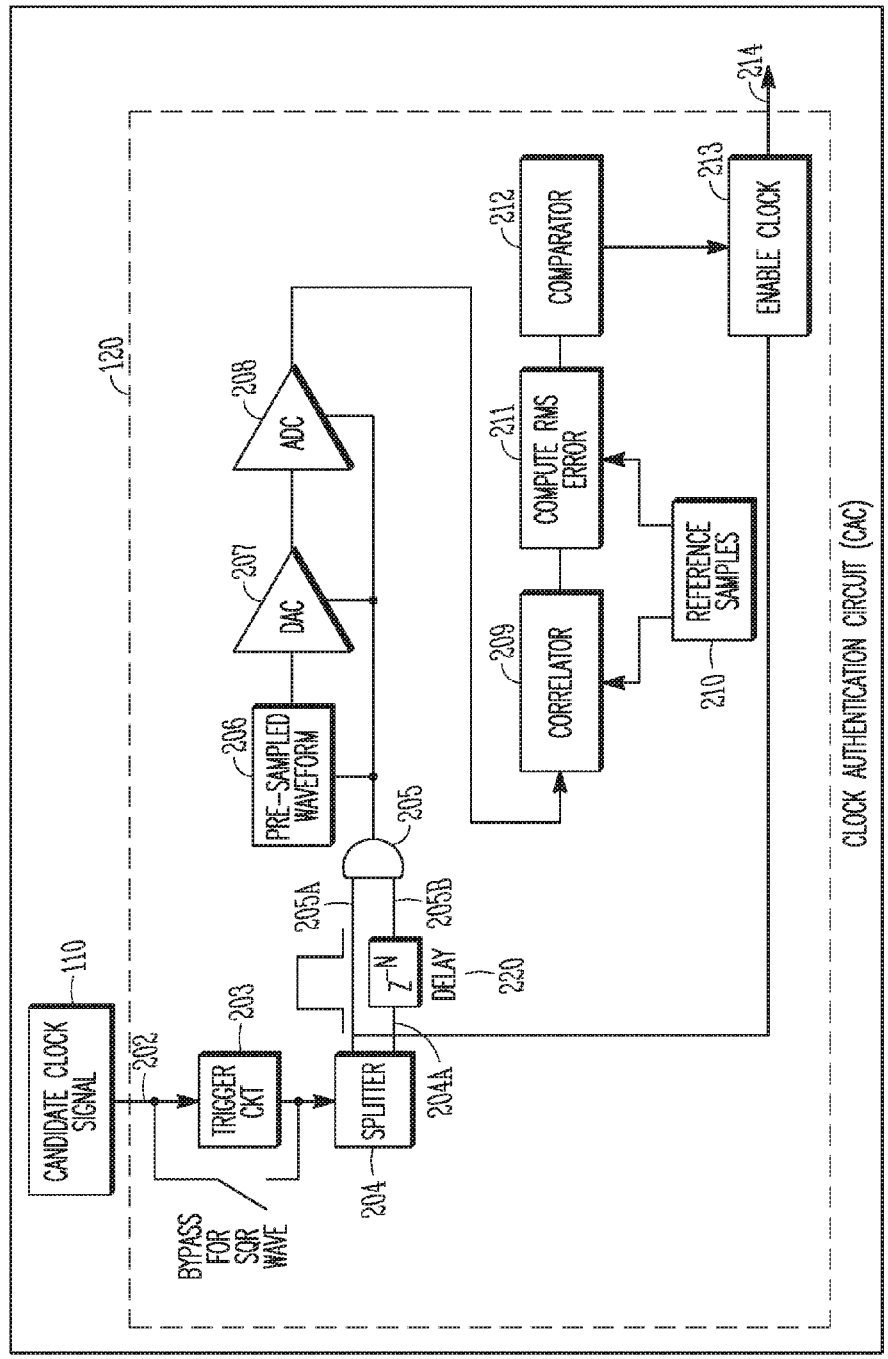
FIG. 2 illustrates an example clock authentication circuit (CAC) in accordance with some embodiments.

FIG. 2 illustrates an example clock authentication circuit (CAC) in accordance with some embodiments. It should be noted that embodiments are not limited to the number, type, size and/or arrangement of components shown in FIG. 2. Some embodiments may not necessarily include all components shown in FIG. 2. In some embodiments, one or more additional components may be included. Some embodiments may include one or more alternate components and/or similar components. It should also be noted that embodiments are not limited to the connectivity of the components as shown in FIG. 2.

In some embodiments, one or more of the components shown in FIG. 2 may be discrete components and/or stand-alone components. However, one or more of the components may be implemented by processing circuitry, in some embodiments. In addition, some embodiments may include a combination of such, in which a first portion of the components may be implemented by processing circuitry and a second portion of the components may be discrete and/or standalone components. As a non-limiting example, the DAC 207 and/or ADC 208 may be standalone components while the components 209-213 may be implemented by processing circuitry, in some embodiments. As another non-limiting example, the DAC 207, the ADC 208, and the components 209-213 may be implemented by processing circuitry, in some embodiments.

It should also be noted that although references may be made herein to components shown in FIG. 2, it is understood that such references may be applicable to operations represented by those components, in some cases. For instance, a description of the "compute RMS error block" 211 may be applicable to an operation (performed by processing circuitry) in which an RMS error is computed, in some cases. Accordingly, one or more of the blocks shown in FIG. 2 may serve to illustrate an operation that may be performed (such as by processing circuitry or otherwise), in some cases.

Figure 3:
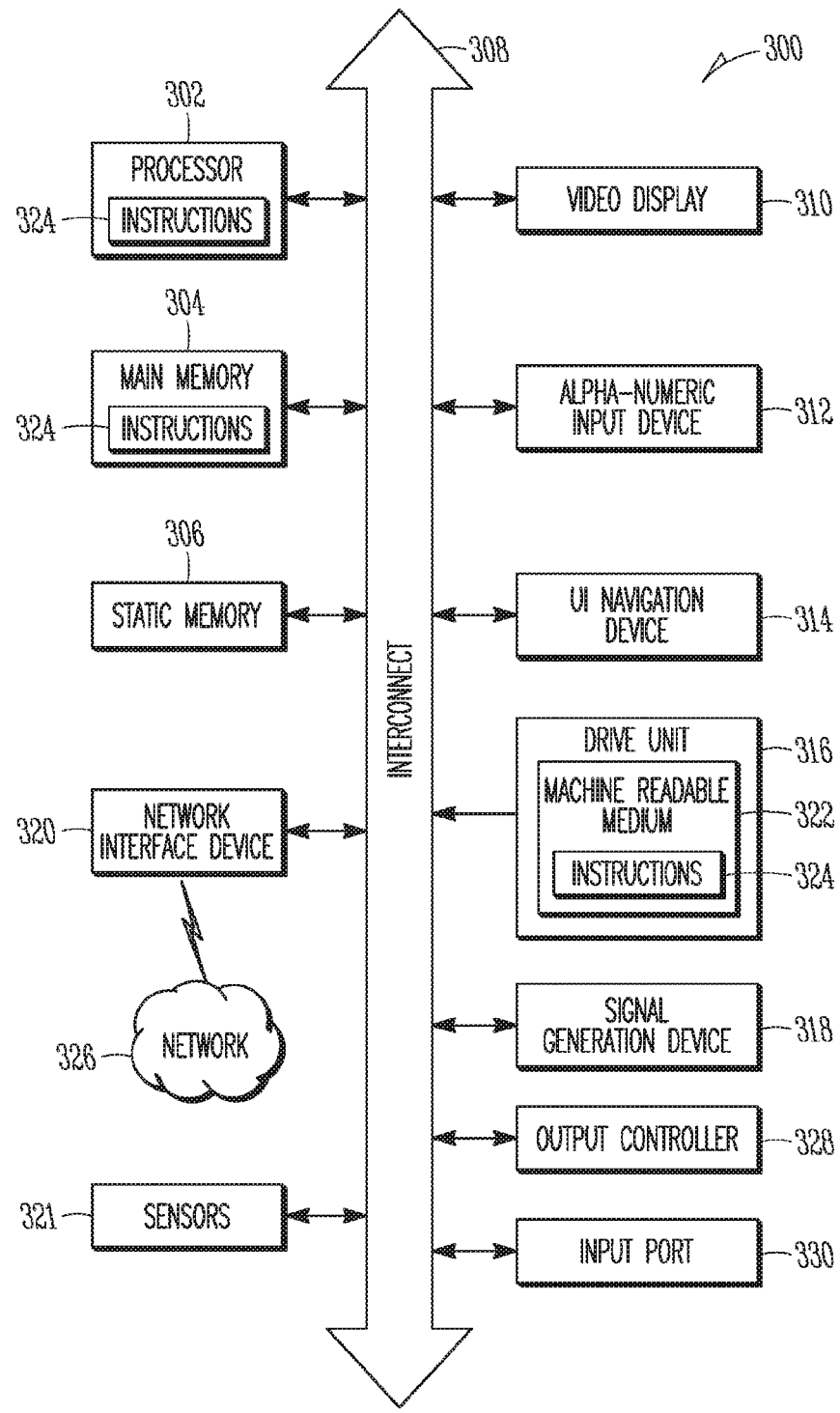
FIG. 3 illustrates a block diagram of an example machine in accordance with some embodiments.

FIG. 3 illustrates a block diagram of an example machine in accordance with some embodiments. In some embodiments, clock authentication circuitry (CAC) may include one or more components shown in FIG. 2 and/or one or more components shown in FIG. 3. For instance, the machine readable medium 322 may be used to implement one or more operations of the CAC 120, in some cases. In some embodiments, the machine 300 may be a device that includes the CAC 120. As an example, a secure phone may perform communication operations using one or more components from FIG. 3 and may be secured by the CAC 120 shown in FIG. 2. In some embodiments, the machine 300 or one or more components of the machine 300 may be configurable to receive clock signals as input, such as at the input port 330 or at other components of the machine 300. Such clock signals may include, but are not limited to candidate clock signals (such as 110 in FIG. 1 or other) and/or reference clock signals.

Any one or more of the techniques (e.g., methodologies) discussed herein may be performed on such a machine 300, in some embodiments. In alternative embodiments, the machine 300 may operate as a standalone device or may be connected (e.g., networked) to other machines. In a networked deployment, the machine 300 may operate in the capacity of a server machine, a client machine, or both in server-client network environments. In an example, the machine 300 may act as a peer machine in peer-to-peer (P2P) (or other distributed) network environment. In some embodiments, the machine 300 may be a cryptographic device, personal computer (PC), a tablet PC, a set-top box (STB), a personal digital assistant (PDA), a mobile device, a base station, an access point (AP) arranged to operate in accordance with an IEEE 802.11 protocol and/or a wireless local area network (WLAN) protocol, a station (STA) arranged to operate in accordance with an IEEE 802.11 protocol and/or a wireless local area network (WLAN) protocol, a User Equipment (UE) arranged to operate in accordance with a Third Generation Partnership Project (3GPP) protocol (including Long Term Evolution (LTE) protocols), an Evolved Node-B (eNB) arranged to operate in accordance with a 3GPP protocol (including LTE protocols), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

As a non-limiting example, a module may include a group of components connected to (permanently, temporarily and/or semi-permanently) a circuit board, processor board and/or other medium.

Machine (e.g., computer system) 300 may include a hardware processor 302 (e.g., a central processing unit (CPU), a graphics processing unit (GPU), a hardware processor core, or any combination thereof), a main memory 304 and a static memory 306, some or all of which may communicate with each other via an interlink (e.g., bus) 308. In some embodiments, components of the machine 300 may communicate with each other via optical interfaces, waveguides and/or other circuitry configured to exchange optical signals. In some embodiments, the interconnect 308 may be configured to communicate optical signals and/or other signals between components of the machine 300.

The machine 300 may further include a display unit 310, an alphanumeric input device 312 (e.g., a keyboard), and a user interface (UI) navigation device 314 (e.g., a mouse). In an example, the display unit 310, input device 312 and UI navigation device 314 may be a touch screen display. The machine 300 may additionally include a storage device (e.g., drive unit) 316, a signal generation device 318 (e.g., a speaker), a network interface device 320, and one or more sensors 321, such as a global positioning system (GPS) sensor, compass, accelerometer, or other sensor. The machine 300 may include an output controller 328, such as a serial (e.g., universal serial bus (USB), parallel or other wired or wireless (e.g., infrared (IR), near field communication (NFC), etc.) connection to communicate or control one or more peripheral devices (e.g., a printer, card reader, etc.).

The storage device 316 may include a machine readable medium 322 on which is stored one or more sets of data structures or instructions 324 (e.g., software) embodying or utilized by any one or more of the techniques or functions described herein. The instructions 324 may also reside, completely or at least partially, within the main memory 304, within static memory 306, or within the hardware processor 302 during execution thereof by the machine 300. In an example, one or any combination of the hardware processor 302, the main memory 304, the static memory 306, or the storage device 316 may constitute machine readable media.

While the machine readable medium 322 is illustrated as a single medium, the term "machine readable medium" may include a single medium or multiple media (e.g., a centralized or distributed database, and/or associated caches and servers) configured to store the one or more instructions 324.

The term "machine readable medium" may include any medium that is capable of storing, encoding, or carrying instructions for execution by the machine 300 and that cause the machine 300 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 324 may further be transmitted or received over a communications network 326 using a transmission medium via the network interface device 320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks). Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 320 may include one or more physical jacks (e.g., Ethernet, coaxial, or phone jacks) or one or more antennas to connect to the communications network 326. In an example, the network interface device 320 may include a plurality of antennas to wirelessly communicate using at least one of single-input multiple-output (SIMO), multiple-input multiple-output (MIMO), or multiple-input single-output (MISO) techniques. In some examples, the network interface device 320 may wirelessly communicate using Multiple User MIMO techniques. The term "transmission medium" shall be taken to include any intangible medium that is capable of storing, encoding or carrying instructions for execution by the machine 300, and includes digital or analog communications signals or other intangible medium to facilitate communication of such software.

Although the CAC 112 and the machine 300 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by CAC may include various components of the CAC 120 shown in FIG. 2 and/or the example machine 300 shown in FIG. 3. Accordingly, in some cases, techniques and operations described herein that refer to the CAC 120 may be applicable to an apparatus for CAC.

In accordance with some embodiments, the CAC 120 may comprise a compression component, such as a logic gate 205, to compress a candidate clock signal that is to be authenticated against a reference clock signal. The CAC 120 may further comprise a digital-to-analog converter (DAC) 207 that may be connected to an analog-to-digital converter (ADC) 208 of the CAC. An ADC output sequence may be generated when a predetermined input sequence is input to the DAC 207 while the DAC 207 and the ADC 208 are driven by the compressed candidate clock signal. The candidate clock signal may be authenticated based on an error measurement between the ADC output sequence and a reference ADC output sequence. These embodiments will be described in more detail below.

Figure 4:
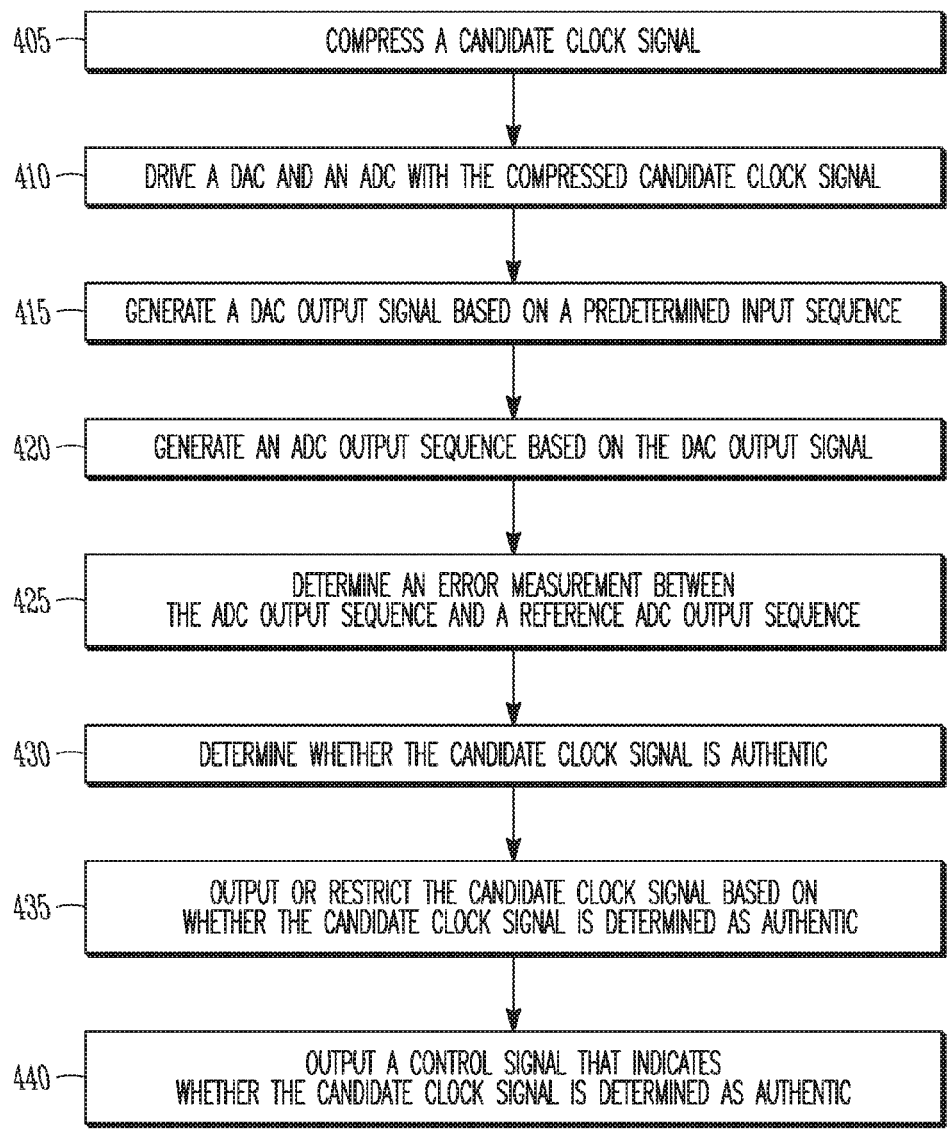
FIG. 4 illustrates the operation of an example method of clock authentication in accordance with some embodiments.

FIG. 4 illustrates the operation of an example method of clock authentication in accordance with some embodiments. In some embodiments, the method 400 may be performed by the CAC 120, although embodiments are not limited as such and the method 400 may be performed by other devices and/or components in some embodiments. In some embodiments, operations of the method 400 may be performed by components such as the DAC 207, ADC 208, components such as 209-213, the logical gate 205 and/or other components (including but not limited to components shown in FIG. 2). Those components may be included in CAC 120 in some embodiments, although embodiments are not limited as such. In descriptions herein of techniques and/or operations, references may be made to components of the CAC 120, but such references are not limiting. The techniques and/or operations may be performed by other components (such as components shown in and/or described by any of FIGS. 1-8) which may or may not necessarily be included in a CAC, in some embodiments.

It is important to note that embodiments of the method 400 may include additional or even fewer operations or processes in comparison to what is illustrated in FIG. 4. In addition, embodiments of the method 400 are not necessarily limited to the chronological order that is shown in FIG. 4. In describing the method 400, reference may be made to FIGS. 1-3 and 5-8, although it is understood that the method 400 may be practiced with any other suitable systems, interfaces and components.

It should also be noted that the method 400 may be applicable to an apparatus for CAC (such as 120), in some embodiments. In some embodiments, the CAC 120 (and/or components of the CAC 120) may operate as part of a system such as a computing device, computer, switch, router, mobile device and/or other device. Embodiments are not limited to these examples, however. The method 400 will be described below with references to FIG. 2, but it is understood that embodiments are not limited to the components shown in FIG. 2 and/or operations represented by those components. As previously described, some embodiments may not necessarily include all of the components shown in FIG. 2, and some embodiments may include additional components. In addition, some embodiments may not necessarily include all operations represented by the components shown in FIG. 2, and some embodiments may include additional operations. It should be noted that processing circuitry may perform one or more operations shown in FIG. 2 (and/or represented by a block of FIG. 2), in some embodiments.

In some embodiments, a candidate clock signal may be input (such as at 202 in FIG. 2) to the CAC 120 for authentication. As a non-limiting example, the candidate clock signal may be authenticated for secure usage be a component external to the CAC 120. The candidate clock signal may be authenticated against a reference clock signal in some cases. Accordingly, the CAC 120 may attempt to determine if the candidate clock signal and the reference clock signal are of a same type, model, design, class and/or other characteristic, in some cases. In some embodiments, the CAC 120 may attempt to verify, validate and/or match one or more such characteristics between the candidate clock signal and the reference clock signal.

The candidate clock signal may be a square wave, sinusoidal signal or any signal that is to be authenticated. It should be noted that a component such as a trigger 203 (such as a Schmidt trigger or other) may be used to convert the candidate clock signal into a different form, in some cases. For instance, a sinusoidal signal may be converted to a square wave. When a square wave is input as the candidate clock signal, the trigger 203 may be bypassed, in some cases. The splitter 204 may be used to send the candidate input signal to multiple components of the CAC.

At operation 405 of the method 400, a candidate clock signal may be compressed by a compression component. In some embodiments, the compression component may be used to increase and/or enhance a phase noise of the output signal in comparison to a phase noise level of the input signal (such as the candidate clock signal). It may be desirable, for operations such as authentication of the candidate clock signal, to deliberately compress the candidate clock signal in a manner in which the phase noise of the output signal dominates. In some embodiments, expected behavior, statistics and/or other comparison benchmarks may be pre-determined for a scenario in which the reference clock signal is also compressed by the compression component.

In some embodiments, the compression component may include one or more logic gates. As a non-limiting example, a logic gate, such as an AND gate. NAND gate and/or other logic gate may be used. In the CAC 120, the AND gate 205 may receive a first input signal 205a, which may be or may be based on the candidate clock signal. The AND gate 205 may also receive a second input signal 205b, which is a delayed version of the first input signal 205a. The second signal 205b may be delayed by a predetermined delay, in some cases. An amount of compression caused by the AND gate may be based at least partly on the amount of delay between the input signals 205a. 205b, in some cases. In some embodiments, expected behavior, statistics and/or other comparison benchmarks may be pre-determined for a scenario in which a compressed reference clock signal is output when the reference clock signal and a delayed version (delayed by the predetermined delay) are input to the AND gate 205.

It should be noted that an arrangement of logic gates and/or other components that provides compression of an input signal may be used, in some embodiments. As a non-limiting example, an arrangement of one or more components that provides AND logic and/or AND functionality may be used. It should also be noted that embodiments are not limited to usage of logic gates, as any suitable component that compresses an input signal may be used. In some embodiments, one or more logic gates and one or more additional components may be included in the compression component. In some embodiments, a compression component may not necessarily include any logic gates.

At operation 410, the DAC 207 and the ADC 208 may be driven by a driver signal. At operation 415, the DAC 207 may generate a DAC output signal based on a predetermined input sequence while the DAC 207 is driven by the driver signal. At operation 420, the ADC 208 may generate an ADC output sequence based on the DAC output signal while the ADC 208 is driven by the driver signal.

The driver signal may be or may be based on the compressed candidate clock signal output from the compression component. For instance, the output of the AND gate 205 may be used to drive the DAC 207 and the ADC 208. In some embodiments, expected behavior, statistics and/or other comparison benchmarks may be pre-determined for a scenario in which a reference ADC output sequence is generated. The reference ADC output sequence may be expected when the predetermined input sequence is input to the DAC 207 while the DAC 207 and the ADC 208 are driven by the output of the AND gate 205 when the reference clock signal and a delayed version (delayed by the predetermined delay) are input to the AND gate 205.

The predetermined input sequence that is input to the DAC may be any suitable sequence of numbers. As an example, a random waveform may be sampled to generate the predetermined input sequence. As another example, an aperiodic signal may be sampled to generate the predetermined input sequence. These examples are not limiting, however, as any suitable techniques for generation of the predetermined input sequence may be used.

Returning to the method 400, at operation 425, an error measurement between the ADC output sequence and the reference ADC output sequence may be determined. Any suitable error measurement may be used, such as a root mean squared (RMS) error, a mean squared error and/or other. In some embodiments, an expected error measurement, such as an expected RMS error or expected mean squared error, may be predetermined based on a scenario in which the compressed reference clock signal drives the DAC 207 and the ADC 208 while the predetermined input sequence is input to the DAC 207. An example method for determination of the expected error measurement and/or expected ADC output sequence will be presented below.

In some embodiments, a phase alignment for the error measurement may be determined. Components such as the DAC 207, the ADC 208 and others may introduce random phases and/or phase shifts. Accordingly, the ADC output sequence generated by the CAC 120 and the reference ADC output sequence may be phase shifted with respect to each other. A cross correlation, such as at the correlator 209, may be used to phase align the two sequences for the determination of the error measurement. The cross correlation may also enable time alignment of the two sequences. For instance, the sequences may be time shifted to a point at which a cross correlation magnitude is maximized. As previously described, it is understood that the correlation operation represented by 209 may be implemented by the processing circuitry, in some embodiments.

At operation 430, the CAC 120 (and/or one or more component of the CAC 120) may determine whether the candidate clock signal is authentic. In some embodiments, the determination may be based at least partly on the error measurement. For instance, the error measurement may be compared (such as at 212 of FIG. 2) to an expected error measurement.

In some embodiments, a determined RMS error may be compared to a reference RMS error and/or expected RMS error. As an example, a determination of whether the candidate clock signal is authentic may be based on whether the determined RMS error is within a range of values. The CAC 120 may determine that the candidate clock signal is authentic when the determined RMS error is within the range. The CAC 120 may determine that the candidate clock signal is not authentic when the determined RMS error is outside of the range. In some embodiments, the range may include the reference RMS error. The range may or may not be symmetric around the reference RMS error. For instance, a range of [(RefRMS−e1), (RefRMS+e2)] may be used, in which RefRMS is the reference RMS error and e1 and e2 are range parameters. Accordingly, e1 and e2 may be the same in some cases, and may be different in other cases. In some cases, the range parameters e1 and e2 may be predetermined fixed values (like voltages or other), but embodiments are not limited as such. In some cases, parameters like e1 and e2 may be based on multipliers, percentages, ratios and/or other. As a non-limiting example of such, e1 may be 5% of RefRMS and e2 may be 3% of RefRMS, in which case the range may be [0.95*RefRMS, 1.03*RefRMS]. In this example, a lowest value of the range may be based on a product of the reference RMS error and a first predetermined multiplier of 0.95. A highest value of the range in this example may be based on a product of the reference RMS error and a second predetermined multiplier of 1.03.

As another example, a determination of whether the candidate clock signal is authentic may be based on whether a difference between the determined RMS error and the reference RMS error is less than, equal to or greater than a predetermined threshold. For instance, when the difference between the determined RMS error the reference RMS error is less than the predetermined threshold, the candidate clock signal may be determined to be authentic. When the difference is greater than or equal to the predetermined threshold, the candidate clock signal may be determined to be not authentic. In these and other examples, predetermined thresholds, predetermined range parameters (such as e1 and e2) and/or other parameters may be based on error bars, confidence intervals and/or other statistical measurements. In some embodiments, such measurements may be determined as part of a method in which the expected ADC output sequence, expected mean squared error, expected RMS error and/or other values are determined. Embodiments are not limited as such, however, as the values may be determined using any suitable technique. For instance, a 95% confidence interval or other value of confidence interval may be used, in some cases.

It should be noted that embodiments are not limited to RMS errors. Accordingly, reference herein to an RMS error (such as a determined RMS error, reference RMS error and/or other RMS error) are not limiting. Accordingly, descriptions of techniques and/or operations herein may include references to an RMS error, but such references are not limiting. Such techniques and/or operations may be applicable, in some cases, to embodiments in which a different error measurement (such as a mean squared error or other) is used.

As another example, a determined mean squared error may be compared to a reference mean squared error and/or expected mean squared error. When a difference between the determined mean squared error the reference mean squared error is less than a predetermined threshold, the candidate clock signal may be determined to be authentic. When the difference is greater than or equal to the predetermined threshold, the candidate clock signal may be determined to be not authentic. In some embodiments, the candidate clock signal may be determined to be authentic or not authentic based on whether the determined mean squared error is within a range of values (such as a range of values like those described above).

Returning to the method 400, the decision on whether the candidate clock signal is authentic may be used to enable and/or disable the candidate clock signal from usage by the external component. Any suitable technique may be used. As an example, at operation 435, the candidate signal may be output to the external component when determined to be authentic and may be restricted from the external component when determined to be not authentic. In some embodiments, one or more switches, gates and/or other components (such as at 213 of FIG. 2) may be used for such purpose. For instance, when the candidate clock signal is determined to be authentic, a switch may be set to pass the candidate clock signal to the external component. When the candidate clock signal is determined to be not authentic, the switch may be set to restrict and/or disable the passing of the candidate clock signal to the external component.

As another example, at operation 440, a control signal that indicates whether or not the candidate clock signal is determined to be authentic may be output. For instance, the control signal may take two different values, such as high/low, 1/0, +A/0 (with "A" a constant), +1/−1 and/or other, to indicate authentic/not authentic in accordance with a predetermined mapping.

Figure 5:
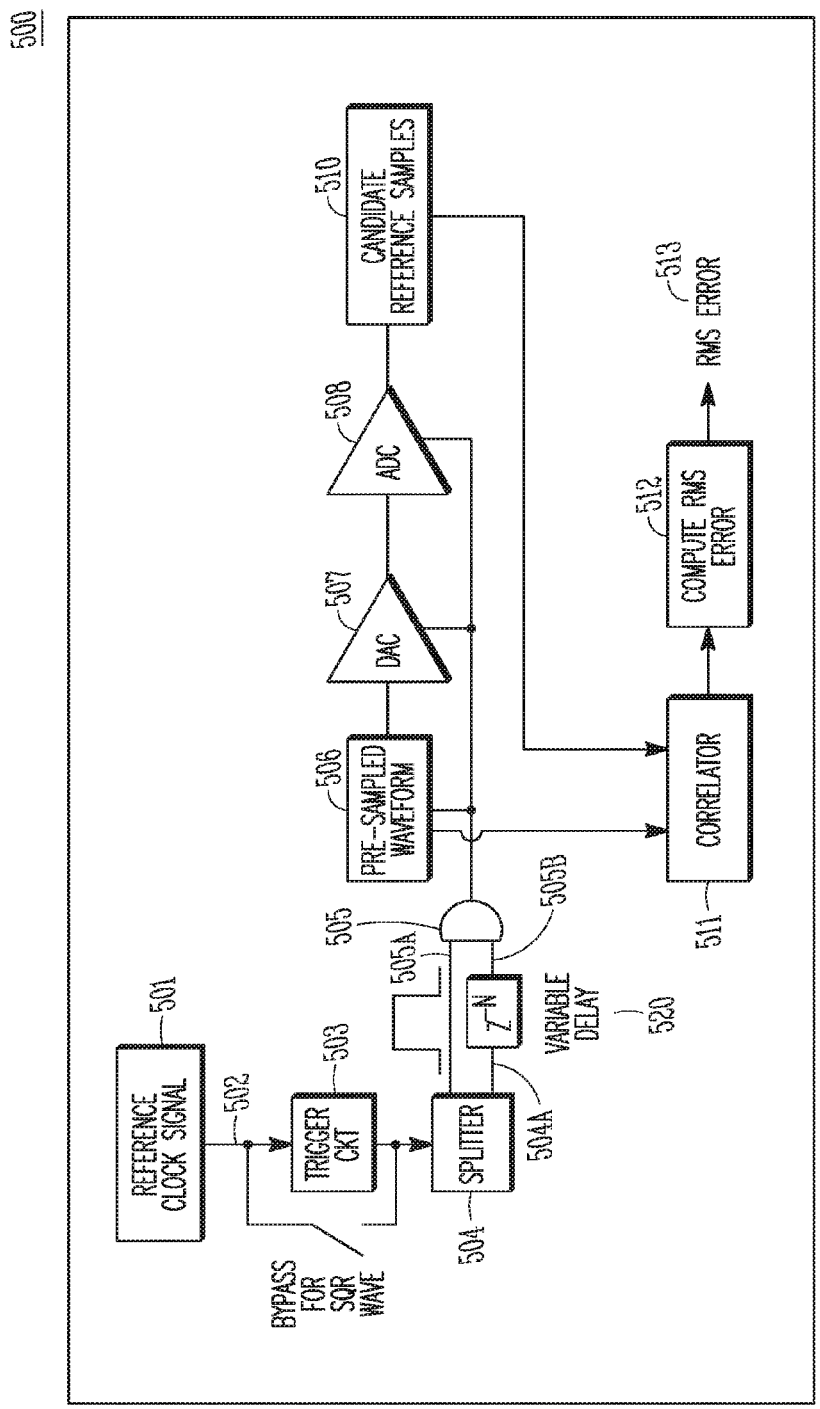
FIG. 5 illustrates an example parameter customization environment in accordance with some embodiments.
Figure 6:
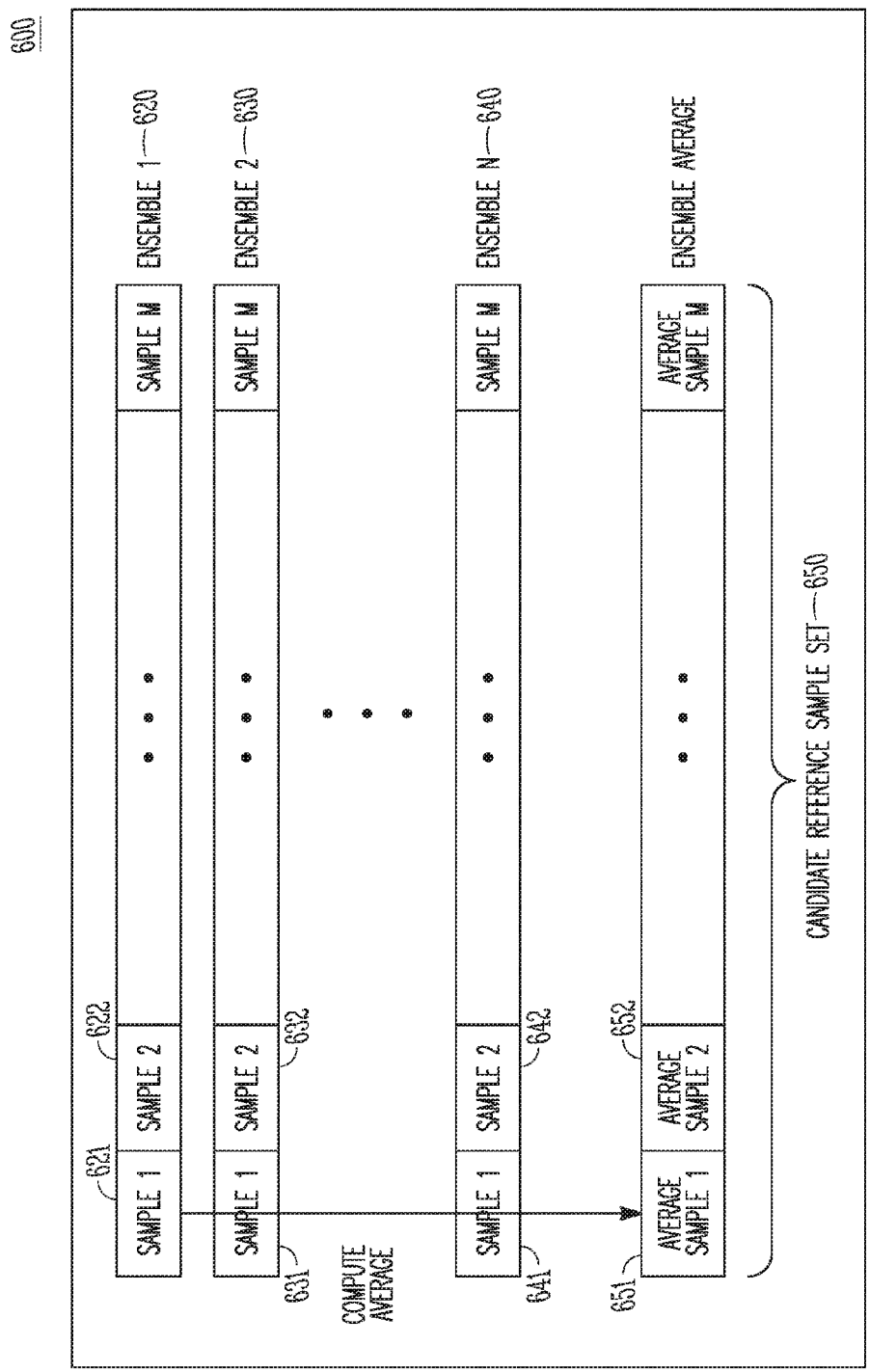
FIG. 6 illustrates an example of an averaging operation in accordance with some embodiments.
Figure 7:
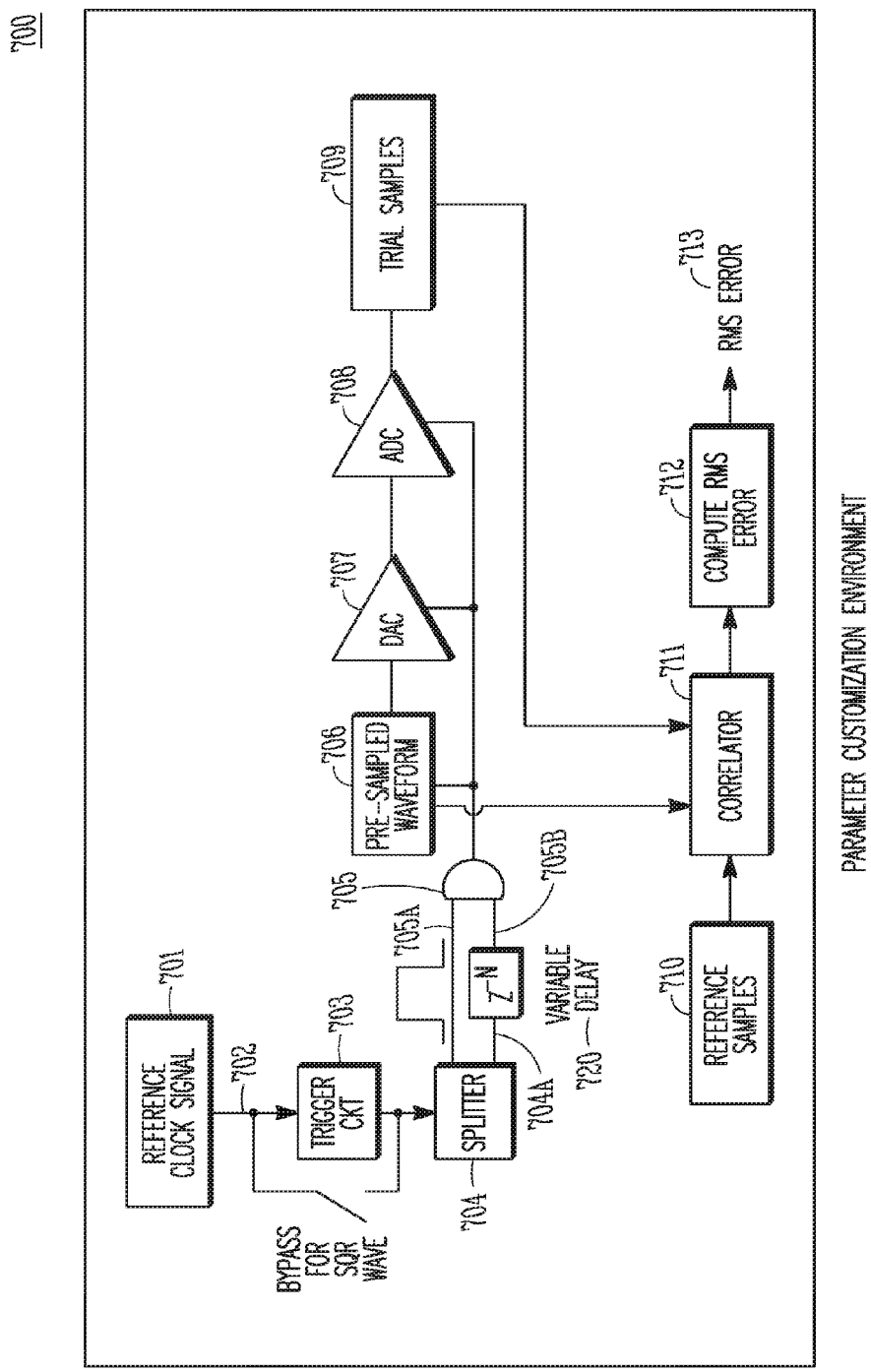
FIG. 7 illustrates another example parameter customization environment in accordance with some embodiments.

FIG. 5 illustrates an example parameter customization environment in accordance with some embodiments. FIG. 6 illustrates an example of an averaging operation in accordance with some embodiments. FIG. 7 illustrates another example parameter customization environment in accordance with some embodiments. As described previously regarding FIG. 2, embodiments are not limited to the number, type, size, connectivity and/or arrangement of components shown in FIGS. 5-7. Some embodiments may not necessarily include all components shown in FIG. 2. Some embodiments may include one or more additional components, alternate components and/or similar components.

In some embodiments, one or more of the components shown in FIGS. 5-7, such as DACs, ADCs, compression components and/or others, may be discrete components and/or standalone components. However, one or more of the components shown in FIGS. 5-7 may be implemented by processing circuitry, in some embodiments. In addition, some embodiments may include a combination of such, in which a first portion of the components may be implemented by processing circuitry and a second portion of the components may be discrete and/or standalone components. It should also be noted that although references may be made herein to components shown in FIGS. 5-7, it is understood that such references may be applicable to operations represented by those components, in some cases. Accordingly, one or more of the blocks shown in FIGS. 5-7 may serve to illustrate an operation that may be performed (such as by processing circuitry or otherwise), in some cases.

The PCE 500 and/or PCE 700 may be used, in some cases, to generate and/or determine one or more parameters to be used in a CAC. For instance, the expected ADC output sequence, an expected error measurement (such as RMS error or other) and/or other expected parameters may be determined. In some embodiments, the one or more parameters may be determined offline such as in a test lab, in a simulation, through analysis and/or other techniques. These embodiments are not limiting, however. In some embodiments, processing circuitry included in the CAC may determine such parameters, in some cases. For instance, the CAC may dynamically determine and/or update parameters to be used.

In some embodiments, the CAC may be customized for a specific reference oscillator by the Parameter Customization Environment (PCE) shown in FIG. 5. A reference clock signal may be used, as indicated by 501, which may be output from the reference oscillator. As previously described, embodiments are not limited to oscillators, oscillator signals and/or clock signals, as other equipment, components and/or signals may be used in some embodiments.

The PCE 500 may be used to generate any or all of the following parameters, in some embodiments, and may be used to generate additional or alternate parameters in some cases. As an example of a parameter, a maximum delay value for clock signal pulse compression in 504a may be generated. As another example of a parameter, values for the reference samples in the Reference Sample Block 510 may be generated. As another example of a parameter, an expected RMS error value at block 512 may be generated.

In some embodiments, a same Pre-Sampled Authentication Waveform block 206, 506 may be used in both the CAC 120 and PCE 500. The block 206, 506 may provide the predetermined DAC input sequence described herein, in some cases. Such a waveform and/or input sequence may be generated using any suitable technique. For instance, the waveform/input sequence may be based on an aperiodic data set that is converted to analog, resampled, and stored as the Reference Samples, which are used for authentication in the CAC 120. Statistically, it may be better for the waveform/input sequence to be based on random data as opposed to periodic data, in some cases. The reason for this is that the misalignment of sampling intervals introduced by phase noise may create a greater RMS error if the data is aperiodic.

It should be noted that in consideration of the clock rates used and in selecting the DAC and ADC, it may be important to consider that the SNR for these devices is given by $SNR=-20*\log(2*pi*f*sigma)$, in which f is the frequency of the waveform being sampled and sigma is the RMS jitter of the reference clock. As is evident in examining the above equation, the greater the frequency, the more the SNR is degraded. It may therefore be desirable, in some cases, to pick f close to fs/2, in which fs is the sampling frequency. By selecting f close to fs/2, effects of compression may be increased and/or maximized, which may cause a desired uncertainty when sampling. An objective of the customizing process may be to determine a maximum amount of delay that can be introduced in the clock signal while a consistent approximation of the Reference Sample set may still be provided. A metric that may be used for consistent approximation is the RMS error between the ensembles of Trial Sample sets collected using the PCE shown in FIG. 2. As an example of a consistent approximation, for a single trial, an RMS error +/− epsilon may be within acceptable to-be-determined confidence limits. The specific value of epsilon may be determined from the desired confidence interval, such as 95% or other suitable value, using normalized Z-values for the Gaussian distribution.

A method for determining the Reference Sample set, Delay and the RMS criterion for a specific reference oscillator is outlined below. It should be noted that embodiments are not limited to the chronological order of operations presented and that some embodiments may include additional operations, fewer operations, alternate operations and/or similar operations.

At operation #1, a delay for the AND gate may be set to 0. At operation #2, the samples in the Pre-Sampled Authentication Waveform at 506 may be converted to an analog waveform by the DAC 507 and may be converted, by the ADC 508, back to a digital waveform. These operations may be repeated N times, creating an ensemble of N Trial Sample data sets. Referring to FIG. 6, ensembles 620, 630, 640 and/or others may be generated. At operation #3, a variance across the ensembles may be determined. It may also be determined whether the variance is converging as N increases. This may be an important criterion, in some cases, as it may ensure that for the data set selected to become the Reference Sample set, the reference oscillator may be correctly identified using a minimum number of trials (the authentication process may be done multiple times to ensure a statistically significant outcome).

At operation #4, the average of these ensembles (shown as 650 in FIG. 6) may be saved as the Candidate Reference Sample set. The average may be computed as a vector passing through each element, vertically. The result is a set of averaged samples as shown in the FIG. 3 below. At operation #5, the delay may be increased by a differential amount dz. Operations #2-#5 may be repeated. The method may stop when the convergence criterion of operation #3 is no longer met. The previous Candidate Reference Sample set may be used as the Reference Sample set. The delay used for the generation of the Reference Sample set may be used as the delay value (such as the predetermined delay that may be used in some embodiments of the method 400 in the compression operation).

At operation #6, a new RMS value (such as an expected RMS error) and an error bar may be determined. The PCE environment 600 shown in FIG. 6 may be used, in some cases. The delay and Reference Sample set selected in operation #5 may be used in the modified PCE configuration 600, in blocks 704a and 710, respectively. The previous Candidate Reference Sample set is now the Reference Sample set in Block 710. The configuration shown may be executed multiple times. Trail samples may be generated with each execution. Blocks 711 and 712 compare the Reference Samples to the Trail Samples and compute the RMS for each trial. The final RMS value may be computed from the RMS values generated for each of the trials.

In some embodiments, once the method described above is completed, the Reference Sample set. Delay and the RMS criterion for the specific reference oscillator may be programmed into the hardware illustrated in FIG. 2.

Figure 8:
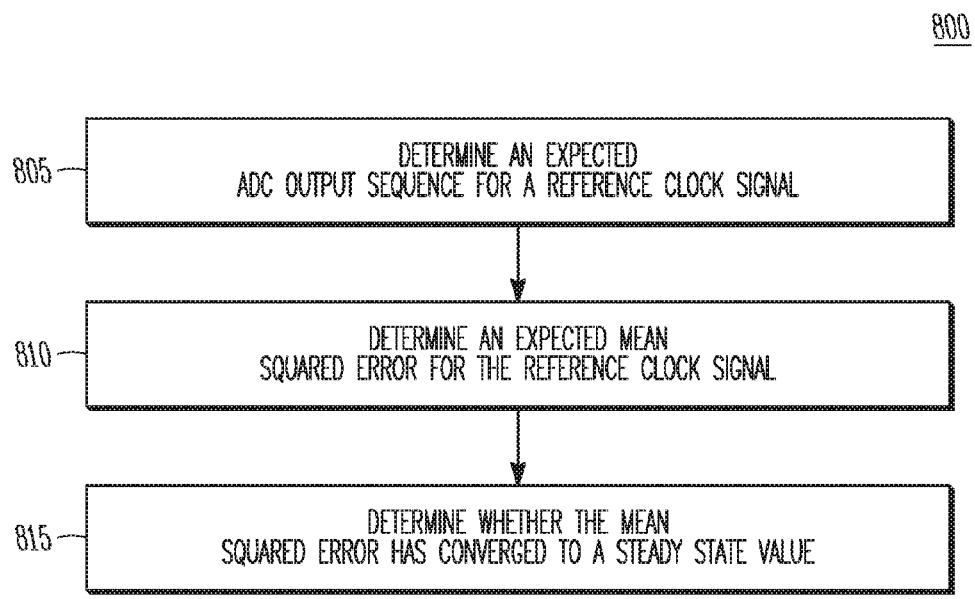
FIG. 8 illustrates the operation of an example method of generation of parameters related to clock authentication in accordance with some embodiments.

FIG. 8 illustrates the operation of an example method of generation of parameters related to clock authentication in accordance with some embodiments. One or more operations of the method 800 may include components, operations, and/or techniques described herein, such as in the descriptions of FIGS. 5-7 and/or other descriptions. Some embodiments may include one or more of operations of the method 800, and some embodiments may include additional operations. Embodiments are not limited to the chronological ordering shown in FIG. 8. In addition, some embodiments may not necessarily include all operations shown.

In some embodiments, the one or more parameters determined as part of the method 800 may be used for a CAC, such as 120 or other. Although the scope of embodiments is not limited as such, the parameters may be determined offline such as in a test lab, in a simulation, through analysis and/or other techniques.

At operation 805, an expected ADC output sequence for a reference clock signal may be determined. At operation 810, an expected mean squared error for the reference clock signal may be determined. At operation 815, it may be determined whether the mean squared error has converged to a steady state value.

In Example 1, clock authentication circuitry (CAC) may comprise a digital-to-analog converter (DAC) to generate a DAC output signal from a predetermined DAC input sequence while driven by a driver signal, wherein the driver signal is based on a candidate clock signal that is to be authenticated by the CAC. The CAC may further comprise an analog-to-digital converter (ADC) to generate an ADC output sequence from the DAC output signal while driven by the driver signal. The CAC may further comprise processing circuitry. The processing circuitry may be configured to determine an error measurement between the ADC output sequence and a reference ADC output sequence. The processing circuitry may be further configured to determine whether the candidate clock signal is authentic based at least partly on the error measurement. The reference ADC output sequence may be based on an expected output sequence when the DAC input sequence is input to the DAC while the DAC and the ADC are driven by a reference clock signal.

In Example 2, the subject matter of Example 1, wherein the candidate clock signal is to be authenticated for secure usage by a component external to the CAC.

In Example 3, the subject matter of one or any combination of Examples 1-2, wherein the CAC may further comprise a compression component to output the driver signal based on a compression of the candidate clock signal. A phase noise of the driver signal may be increased in comparison to a phase noise level of the candidate clock signal.

In Example 4, the subject matter of one or any combination of Examples 1-3, wherein the compression component may include a logic gate for which an output signal is based on an AND function for a first input signal and a second input signal. The first input signal may be based on the candidate clock signal. The second input signal may be based on the first input signal delayed by a predetermined delay.

In Example 5, the subject matter of one or any combination of Examples 1-4, wherein the reference clock signal for the reference ADC output sequence may be based on an expected output signal of the compression component when an uncompressed reference clock signal is input to the compression component.

In Example 6, the subject matter of one or any combination of Examples 1-5, wherein the error measurement may include a mean squared error between the ADC output sequence and the reference ADC output sequence.

In Example 7, the subject matter of one or any combination of Examples 1-6, wherein the candidate clock signal may be determined to be authentic when the determined mean squared error is within a predetermined range of values between a lower value and an upper value. The candidate clock signal may be determined to be not authentic when the determined mean squared error is outside of the predetermined range. The lower value of the range may be less than a reference mean squared error and the upper value of the range may be greater than the reference mean squared error. The reference mean squared error may be based on an expected mean squared error when the DAC input sequence is input to the DAC while the DAC and the ADC are driven by the reference clock signal.

In Example 8, the subject matter of one or any combination of Examples 1-7, wherein the range of values may be configurable to be symmetric around the reference mean squared error or asymmetric around the reference mean squared error.

In Example 9, the subject matter of one or any combination of Examples 1-8, wherein the candidate clock signal may be determined to be authentic when a difference between the determined mean squared error and a reference mean squared error is less than a predetermined threshold. The candidate clock signal may be determined to be not authentic when the difference is greater than or equal to the threshold. The reference mean squared error may be based on an expected mean squared error when the DAC input sequence is input to the DAC while the DAC and the ADC are driven by the reference clock signal.

In Example 10, the subject matter of one or any combination of Examples 1-9, wherein the processing circuitry may be further configured to determine a phase alignment for the error measurement based on a cross correlation between the ADC output sequence and the reference ADC output sequence.

In Example 11, the subject matter of one or any combination of Examples 1-10, wherein the mean squared error may include a root mean squared (RMS) error between the ADC output sequence and the reference ADC output sequence.

In Example 12, the subject matter of one or any combination of Examples 1-11, wherein the processing circuitry may be further configured to send the candidate clock signal to a component external to the CAC when it is determined that the candidate clock signal is authentic. The processing circuitry may be further configured to restrict the candidate clock signal from the external component when it is determined that the candidate clock signal is not authentic.

In Example 13, the subject matter of one or any combination of Examples 1-12, wherein the processing circuitry may be further configured to send, to a component external to the CAC, a control signal that indicates whether the candidate clock signal is determined to be authentic.

In Example 14, the subject matter of one or any combination of Examples 1-13, wherein the processing circuitry may include components of a field programmable gate array (FPGA) or of an application specific integrated circuit (ASIC).

In Example 15, the subject matter of one or any combination of Examples 1-14, wherein the DAC and the ADC may include components of the field programmable gate array (FPGA) or of the application specific integrated circuit (ASIC).

In Example 16, clock authentication circuitry (CAC) may comprise a compression component to compress a candidate clock signal that is to be authenticated against a reference clock signal. The CAC may further comprise a digital-to-analog converter (DAC) to generate, while driven by the compressed candidate clock signal, a DAC output signal based on a predetermined input sequence. The CAC may further comprise an analog-to-digital converter (ADC) to generate, while driven by the compressed candidate clock signal an ADC output sequence based on the DAC output signal. The CAC may further comprise processing circuitry configured to authenticate the candidate clock signal based on an error measurement between the ADC output sequence and a reference ADC output sequence. The reference ADC output sequence may be expected when the predetermined input sequence is input to the DAC while the DAC and the ADC are driven by a reference clock signal compressed by the compression component.

In Example 17, the subject matter of Example 16, wherein the compression component may increase a phase noise of the compressed candidate clock signal in comparison to a phase noise of the candidate clock signal. The increase of the phase noise may be to enhance a difference between the ADC output sequence and a reference ADC output sequence for the error measurement.

In Example 18, the subject matter of one or any combination of Examples 16-17, wherein the compression component may include a logic gate for which an output signal is based on an AND function for a first input signal and a second input signal. The first input signal may be based on the candidate clock signal. The second input signal may be based on the first input signal delayed by a predetermined delay.

In Example 19, the subject matter of one or any combination of Examples 16-18, wherein the error measurement may include a root mean squared (RMS) error between the ADC output sequence and the reference ADC output sequence.

In Example 20, the subject matter of one or any combination of Examples 16-19, wherein the candidate clock signal may be determined to be authentic when the determined mean squared error is within a range of values that includes a reference mean squared error. The range may be configurable to be symmetric or asymmetric around the reference mean squared error. The candidate clock signal may be determined to be not authentic when the determined mean squared error is outside of the range of values. The reference mean squared error may be based on an expected mean squared error when the DAC input sequence is input to the DAC while the DAC and the ADC are driven by the reference clock signal.

In Example 21, the subject matter of one or any combination of Examples 16-20, wherein a lowest value of the range of values may be based on a product of a first predetermined multiplier and the reference mean squared error. A highest value of the range of values may be based on a product of a second predetermined multiplier and the reference mean squared error.

In Example 22, a method of authenticating a candidate clock signal by clock authentication circuitry (CAC) may comprise compressing the candidate clock signal. The method may further comprise driving, with the compressed candidate clock signal, a digital-to-analog converter (DAC) of the CAC and an analog-to-digital converter (ADC) of the CAC, the ADC connected to the DAC to receive DAC output signals. The method may further comprise generating an ADC output sequence based on a predetermined input sequence input to the DAC. The method may further comprise determining an error measurement between the ADC output sequence and a predetermined ADC output sequence that is expected when a compressed reference signal drives the DAC and the ADC while the predetermined input sequence is input to the DAC. The method may further comprise determining, based on the error measurement, whether the candidate clock signal is authentic.

In Example 23, the subject matter of Example 22, wherein the candidate clock signal may be compressed by a logic gate for which an output signal is based on an AND function for a first input signal and a second input signal. The method may further comprise inputting the candidate clock signal to the logic gate as the first input signal. The method may further comprise delaying the candidate clock signal by a predetermined delay. The method may further comprise inputting the delayed candidate clock signal to the logic gate as the second input signal.

In Example 24, a non-transitory computer-readable storage medium may store instructions for execution by one or more processors to perform operations for determination of a parameter for clock authentication circuitry (CAC). The operations may configure the one or more processors to determine, for the CAC, an expected analog-to-digital (ADC) output sequence based on an average of a group of output sequences from an ADC. The to determine, for the CAC, an expected mean squared error based on a mean squared error between the group of ADC output sequences and the average of the group of ADC output sequence. The ADC output sequences of the group may be generated when: the ADC is configured to receive, as input, output signals of a digital-to-analog converter (DAC) connected to the ADC; a predetermined input sequence is input to the DAC; and the DAC and the ADC are driven by a compressed reference clock signal output from a compression component when a reference clock signal is input.

In Example 25, the subject matter of Example 24, wherein the compression component may include a logic gate for which an output signal is based on an AND function for a first input signal and a second input signal. The first input signal may be based on the reference clock signal. The second input signal may be based on the first input signal delayed by a configurable delay.

In Example 26, the subject matter of one or any combination of Examples 24-25, wherein the operations may further configure the one or more processors to determine a steady state delay value at which the mean squared error converges to a range that is within a threshold of a steady state mean squared error. The configurable delay may be set to the determined steady state delay value for the determination of the expected ADC output sequence and the determination of the expected mean squared error.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. Clock authentication circuitry (CAC), comprising:
a digital-to-analog converter (DAC) to generate a DAC output signal from a predetermined DAC input sequence while driven by a driver signal wherein the driver signal is based on a candidate clock signal that is to be authenticated by the CAC;
an analog-to-digital converter (ADC) to generate an ADC output sequence from the DAC output signal while driven by the driver signal; and
processing circuitry configured to:
determine an error measurement between the ADC output sequence and a reference ADC output sequence; and
determine whether the candidate clock signal is authentic based at least partly on the error measurement,
wherein the reference ADC output sequence is based on an expected output sequence when the DAC input sequence is input to the DAC while the DAC and the ADC are driven by a reference clock signal.

2. The CAC according to claim 1, wherein the candidate clock signal is to be authenticated for secure usage by a component external to the CAC.

3. The CAC according to claim 1, wherein:
the CAC further comprises a compression component to output the driver signal based on a compression of the candidate clock signal, and
a phase noise of the driver signal is increased in comparison to a phase noise level of the candidate clock signal.

4. The CAC according to claim 3, wherein:
the compression component includes a logic gate for which an output signal is based on an AND function for a first input signal and a second input signal,
the first input signal is based on the candidate clock signal, and
the second input signal is based on the first input signal delayed by a predetermined delay.

5. The CAC according to claim 3, wherein the reference clock signal for the reference ADC output sequence is based on an expected output signal of the compression component when an uncompressed reference clock signal is input to the compression component.

6. The CAC according to claim 1, wherein the error measurement includes a mean squared error between the ADC output sequence and the reference ADC output sequence.

7. The CAC according to claim 6, wherein:
the candidate clock signal is determined to be authentic when the determined mean squared error is within a predetermined range of values between a lower value and an upper value,
the candidate clock signal is determined to be not authentic when the determined mean squared error is outside of the predetermined range,
the lower value of the range is less than a reference mean squared error and the upper value of the range is greater than the reference mean squared error, and
the reference mean squared error is based on an expected mean squared error when the DAC input sequence is input to the DAC while the DAC and the ADC are driven by the reference clock signal.

8. The CAC according to claim 7, wherein the range of values is configurable to be symmetric around the reference mean squared error or asymmetric around the reference mean squared error.

9. The CAC according to claim 6, wherein:
the candidate clock signal is determined to be authentic when a difference between the determined mean squared error and a reference mean squared error is less than a predetermined threshold,
the candidate clock signal is determined to be not authentic when the difference is greater than or equal to the threshold, and
the reference mean squared error is based on an expected mean squared error when the DAC input sequence is input to the DAC while the DAC and the ADC are driven by the reference clock signal.

10. The CAC according to claim 6, the processing circuitry further configured to determine a phase alignment for the error measurement based on a cross correlation between the ADC output sequence and the reference ADC output sequence.

11. The CAC according to claim 6, wherein the mean squared error includes a root mean squared (RMS) error between the ADC output sequence and the reference ADC output sequence.

12. The CAC according to claim 1, the processing circuitry further configured to:
send the candidate clock signal to a component external to the CAC when it is determined that the candidate clock signal is authentic; and
restrict the candidate clock signal from the external component when it is determined that the candidate clock signal is not authentic.

13. The CAC according to claim 1, the processing circuitry further configured to send, to a component external to the CAC, a control signal that indicates whether the candidate clock signal is determined to be authentic.

14. The CAC according to claim 1, wherein the processing circuitry includes components of a field programmable gate array (FPGA) or of an application specific integrated circuit (ASIC).

15. The CAC according to claim 14, wherein the DAC and the ADC include components of the field programmable gate array (FPGA) or of the application specific integrated circuit (ASIC).

16. Clock authentication circuitry (CAC), comprising:
a compression component to compress a candidate clock signal that is to be authenticated against a reference clock signal;
a digital-to-analog converter (DAC) to generate, while driven by the compressed candidate clock signal, a DAC output signal based on a predetermined input sequence;
an analog-to-digital converter (ADC) to generate, while driven by the compressed candidate clock signal, an ADC output sequence based on the DAC output signal; and
processing circuitry configured to authenticate the candidate clock signal based on an error measurement between the ADC output sequence and a reference ADC output sequence,
wherein the reference ADC output sequence is expected when the predetermined input sequence is input to the DAC while the DAC and the ADC are driven by a reference clock signal compressed by the compression component.

17. The CAC according to claim 16, wherein:
the compression component is to increase a phase noise of the compressed candidate clock signal in comparison to a phase noise of the candidate clock signal, and
the increase of the phase noise is to enhance a difference between the ADC output sequence and a reference ADC output sequence for the error measurement.

18. The CAC according to claim 16, wherein:
the compression component includes a logic gate for which an output signal is based on an AND function for a first input signal and a second input signal,
the first input signal is based on the candidate clock signal, and
the second input signal is based on the first input signal delayed by a predetermined delay.

19. The CAC according to claim 16, wherein the error measurement includes a root mean squared (RMS) error between the ADC output sequence and the reference ADC output sequence.

20. The CAC according to claim 19, wherein:
the candidate clock signal is determined to be authentic when the determined mean squared error is within a range of values that includes a reference mean squared error, wherein the range is configurable to be symmetric or asymmetric around the reference mean squared error,
the candidate clock signal is determined to be not authentic when the determined mean squared error is outside of the range of values, and
the reference mean squared error is based on an expected mean squared error when the DAC input sequence is input to the DAC while the DAC and the ADC are driven by the reference clock signal.

21. The CAC according to claim 20, wherein:
a lowest value of the range of values is based on a product of a first predetermined multiplier and the reference mean squared error, and
a highest value of the range of values is based on a product of a second predetermined multiplier and the reference mean squared error.

22. A method of authenticating a candidate clock signal by clock authentication circuitry (CAC), the method comprising:
compressing the candidate clock signal;
driving, with the compressed candidate clock signal a digital-to-analog converter (DAC) of the CAC and an analog-to-digital converter (ADC) of the CAC, the ADC connected to the DAC to receive DAC output signals;
generating an ADC output sequence based on a predetermined input sequence input to the DAC; and
determining an error measurement between the ADC output sequence and a predetermined ADC output sequence that is expected when a compressed reference signal drives the DAC and the ADC while the predetermined input sequence is input to the DAC,
determining, based on the error measurement, whether the candidate clock signal is authentic.

23. The method according to claim 22, wherein:
the candidate clock signal is compressed by a logic gate for which an output signal is based on an AND function for a first input signal and a second input signal,
the method further comprises:
inputting the candidate clock signal to the logic gate as the first input signal;
delaying the candidate clock signal by a predetermined delay; and
inputting the delayed candidate clock signal to the logic gate as the second input signal.

24. A non-transitory computer-readable storage medium that stores instructions for execution by one or more processors to perform operations for determination of a parameter for clock authentication circuitry (CAC), the operations to configure the one or more processors to:
determine, for the CAC, an expected analog-to-digital (ADC) output sequence based on an average of a group of output sequences from an ADC; and
determine, for the CAC, an expected mean squared error based on a mean squared error between the group of ADC output sequences and the average of the group of ADC output sequence,
wherein the ADC output sequences of the group are generated when:
the ADC is configured to receive, as input, output signals of a digital-to-analog converter (DAC) connected to the ADC,
a predetermined input sequence is input to the DAC, and
the DAC and the ADC are driven by a compressed reference clock signal output from a compression component when a reference clock signal is input.

25. The non-transitory computer-readable storage medium according to claim 24, wherein:
the compression component includes a logic gate for which an output signal is based on an AND function for a first input signal and a second input signal,
the first input signal is based on the reference clock signal, and
the second input signal is based on the first input signal delayed by a configurable delay.

26. The non-transitory computer-readable storage medium according to claim 25, wherein:
the operations are to further configure the one or more processors to determine a steady state delay value at which the mean squared error converges to a range that is within a threshold of a steady state mean squared error, and
the configurable delay is set to the determined steady state delay value for the determination of the expected ADC output sequence and the determination of the expected mean squared error.

* * * * *

UNITED STATES PATENT AND TRADEMARK OFFICE
CERTIFICATE OF CORRECTION

PATENT NO. : 9,621,178 B2
APPLICATION NO. : 15/210230
DATED : April 11, 2017
INVENTOR(S) : Graceffo et al.

It is certified that error appears in the above-identified patent and that said Letters Patent is hereby corrected as shown below:

In the Specification

In Column 1, Line 8, delete "8." and insert --8,-- therefor

In Column 4, Line 66, delete "parallel" and insert --parallel,-- therefor

In Column 5, Line 49, delete "networks)." and insert --networks),-- therefor

In Column 6, Line 6, delete "112" and insert --120-- therefor

In Column 7, Line 41, delete "signal" and insert --signal,-- therefor (Second Occurrence)

In Column 8, Line 8, delete "gate." and insert --gate,-- therefor

In Column 8, Line 17, delete "205a." and insert --205a,-- therefor

In Column 13, Line 9, delete "set." and insert --set,-- therefor

In the Claims

In Column 17, Line 10, in Claim 1, delete "signal" and insert --signal,-- therefor In Column 19, Line 45, in Claim 22, delete "signal" and insert --signal,-- therefor Signed and Sealed this
Fifth Day of May, 2020

Andrei Iancu
*Director of the United States Patent and Trademark Office*